Dec. 16, 1952        O. M. STONE        2,621,562
COLLAPSIBLE STEREOSCOPE
Filed Aug. 18, 1950        2 SHEETS—SHEET 1
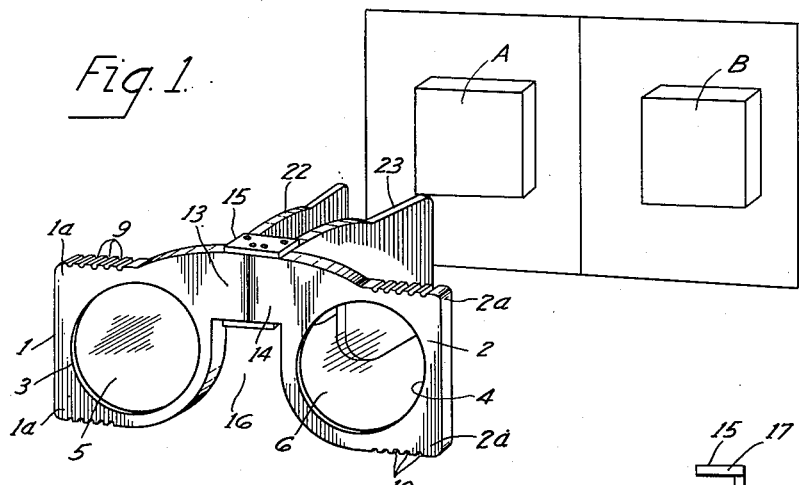
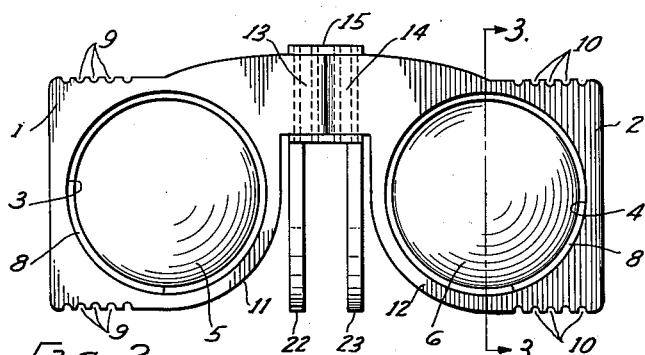
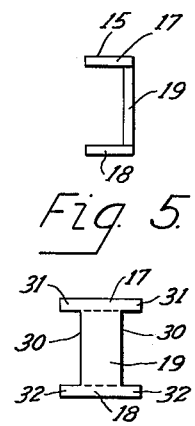
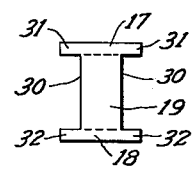
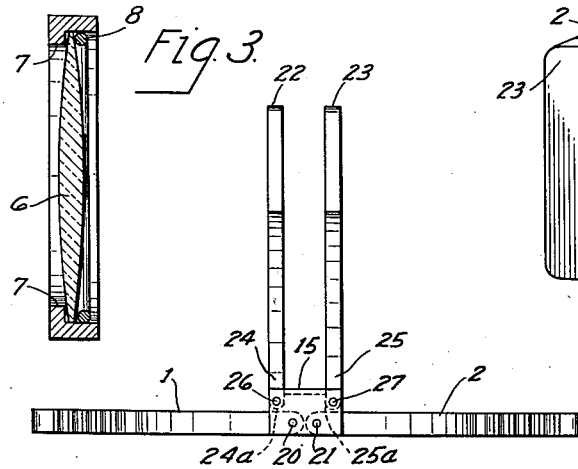
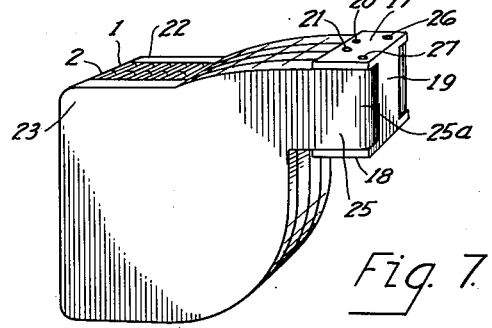
INVENTOR.
OLIVER M. STONE
BY Bosworth & Sessions
ATTORNEYS.

Dec. 16, 1952  O. M. STONE  2,621,562
COLLAPSIBLE STEREOSCOPE

Filed Aug. 18, 1950  2 SHEETS—SHEET 2

INVENTOR.
OLIVER M. STONE
BY
Bosworth + Sessions
ATTORNEYS.

Patented Dec. 16, 1952

2,621,562

UNITED STATES PATENT OFFICE 2,621,562

COLLAPSIBLE STEREOSCOPE

Oliver M. Stone, Cleveland, Ohio

Application August 18, 1950, Serial No. 180,184

2 Claims. (Cl. 88—29)

This invention relates to optical instruments and in particular to stereoscopes employed by a user for viewing stereograms, stereoscopic pairs of drawings, photographs and the like.

It is an object of the present invention to provide a stereoscope that may be conveniently and comfortably held by the user before his eyes in viewing stereoscopic pairs whether or not the user wears spectacles of any type. Another object of the invention is to provide a stereoscope that may be folded compactly when not in use so as to require a minimum storage space. Other objects of the invention are the provision of a stereoscope which includes means for separating or dividing the two images of the stereoscopic pairs being viewed; the provision of a stereoscope which has means for protectively covering the lens elements when the instrument is not in use; the provision of an optical instrument that may be conveniently held by the hand of a user or which may be supported as a stand; and the provision of a stereoscope that is durable, sturdy, economical to manufacture and light in weight.

Figure 8:
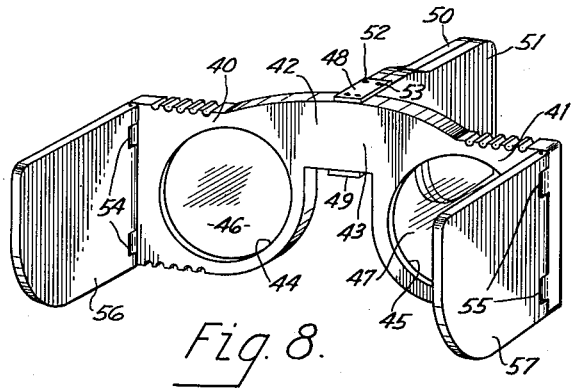
Figure 10:
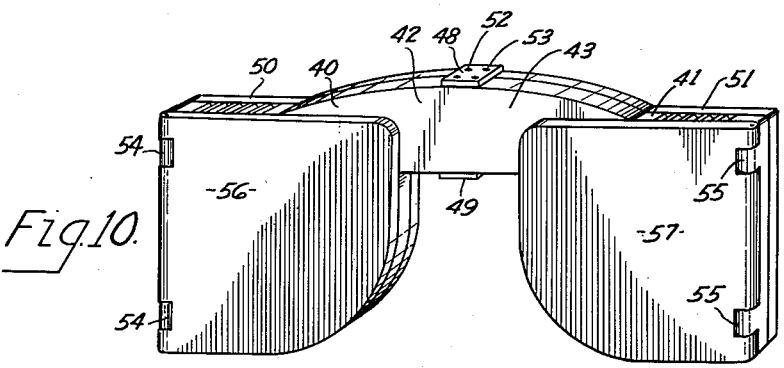
Figure 9:
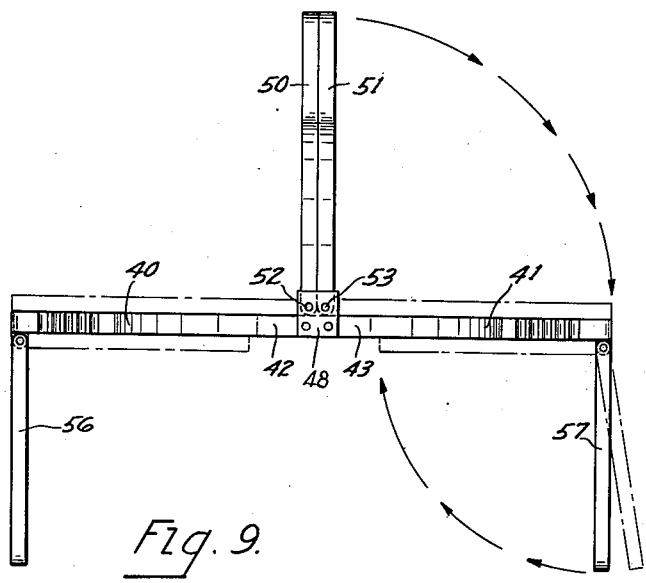

These and other objects of my invention will appear from the following description of a preferred embodiment thereof, reference being had to the accompanying drawings in which Figure 1 is a perspective view showing my stereoscope in position for viewing stereoscopic pairs of drawings; Figure 2 is a front elevation of the stereoscope in the unfolded or operative position; Figure 3 is a vertical section taken on the line 3—3 of Figure 2; Figure 4 is a plan view of the stereoscope shown in Figure 2; Figure 5 is an elevation of a bracket which forms a part of the stereoscope; Figure 6 is a rear elevation of the bracket of Figure 4; Figure 7 is a perspective view of the stereoscope in the folded or inoperative position; Figure 8 is a perspective view of a modified form of a stereoscope shown in the unfolded or operative position; Figure 9 is a plan view of the stereoscope of Figure 8; and Figure 10 is a perspective view of the stereoscope of Figure 8 shown in a folded or inoperative position.

My invention comprehends an optical instrument and more particularly a stereoscope that may be conveniently held by the hand of the user and adjusted in position before his eyes for viewing stereograms and all types of stereoscopic pairs and particularly those which may be illustrated in a book, pamphlet and the like. One form of the stereoscope which embodies my invention is shown in Figure 1 in a typical position for use in viewing stereoscopic pairs A and B of drawings of a selected object. The stereoscope comprises a pair of substantially identical lens holding members 1 and 2 preferably formed from plastic, aluminum, or other light material and which are provided with transverse holes or apertures 3 and 4 respectively for receiving lens elements 5 and 6 respectively. In order to hold lenses 5 and 6 in apertures 3 and 4 of the lens holding members, annular flanges 7, see Figure 3, whose diameters are slightly smaller than that of the adjacent portions of the apertures are formed in the apertures on the rear sides of the members 1 and 2 and constitute abutments against which the lens elements rest when in the proper position in the members. After the lenses have been inserted in the apertures of members 1 and 2, they are removably held in position against flanges 7 by means of snap rings 8 disposed on the opposite side of each lens from flanges 7.

It is desirable for reasons of compactness and economy of material that the face area of each member and lens be as small as possible with the limits of furnishing an adequate area for viewing objects therethrough and for permitting convenient handling of the instrument by the user. For these reasons each member is constructed essentially as a frame for the lenses having squared corner portions 1a and 2a which permit the instrument to be firmly held by the user. The top and bottom edges of the corners are ribbed or fluted as indicated at 9 and 10 to prevent slipping of the device when held by the user. The inner edges 11 and 12 of member 1 are rounded to conform substantially to the shape of apertures 3 and 4 and have arm portions 13 and 14 projecting inwardly therefrom at the top to pivotally support the members 1 and 2. The lens holding members are pivotally connected to a bracket 15 disposed between them so that arms 13 and 14 will face each other when the instrument is opened to the operative position shown in Figures 1 and 2 and form a pivoted bridge for the members and in conjunction with the rounded edges 11 and 12 define a space 16 into which the bridge of the user's nose is adapted to fit when he holds the instrument before his eyes. It will be noted that the space 16 has a greater width near the bottom of the instrument than near the top, which feature permits the instrument to be used by different observers having different widths of noses, the rounded edges 11 and 12 also generally conforming to the contour of the side of the nose to promote comfort during use.

The bracket 15 to which arm portions 13 and 14 of members 1 and 2 are pivotally connected is substantially U-shaped as shown in Figures 5 and 6. The bracket 15 has a top flange 17 and a bottom flange 18 connected by a web 19 and is arranged with respect to the members 1 and 2 so that flanges 17 and 18 overlay the top and bottom edges of arms 13 and 14. Suitable holes are drilled or otherwise formed in flanges 17 and 18 as well as in arms 13 and 14, which are aligned with their axes substantially parallel for receiving pins 20 and 21 to effect a pivotal connection between the lens holding members 1 and 2 and bracket 15. It will be noted that with the members 1 and 2 so supported and pivotally tied together, they may be swung or moved about their respective pivot axes toward and away from each other, that is, between the positions of the members shown in Figure 7 and in Figure 4.

In order to divide and separate the images of the pairs A and B as seen by the observer while viewing them through lenses 5 and 6, I have provided a pair of plates 22 and 23 which conform generally to the shape of lens holding members 1 and 2 and which are also pivotally connected to bracket 15. Plates 22 and 23 have arm portions 24 and 25 which are slightly longer than arms 13 and 14 of members 1 and 2 and which also extend between flanges 17 and 18 of bracket 15. Arms 24 and 25 are pivotally connected to bracket 15 in the manner described in connection with members 1 and 2 so as to pivot about pins 26 and 27.

It is desirable when the stereoscope is in use, that is, when an observer or user is viewing the stereograms A and B through lenses 5 and 6, that the lens holding members should not pivot beyond a plane perpendicular to the line of sight of the observer. Also, it is desirable that the partition members or plates 22 and 23 be adjustable with respect to the line of sight of the observer to the stereograms in order to effect proper division of the views. For these purposes, the web 19 of bracket 15 is cut back as shown at 30 so that the width of the web is less than the corresponding dimension of the flanges 17 and 18 and so that the flanges extend beyond the web as at 31 and 32. The holes in flanges 17 and 18 in which plate pins 26 and 27 are fixed are located therein near the junctures of web 19 and flanges 17 and 18 in the projecting portions 31 and 32, see Figures 4 and 7. With this disposition of the pivotal axes of plates 22 and 23, these plates are each free to swing or pivot substantially 180° with respect to the bracket, the limits of movement of the plates toward each other in the operative position being defined by the extent of the undercuts 30 on the web 19. It will be noted that the mounting holes in bracket flanges 17 and 18 for pins 20 and 21 of lens holding members are located adjacent the open or front end of bracket 15 and are spaced apart a lesser distance than pins 26 and 27. When members 1 and 2 are swung into the operative position and with plates 22 and 23 also in the operative position as shown in Figures 1, 2 and 4, the rounded inner edges 24a and 25a of plate arms 24 and 25 will abut against the rear surfaces of arms 13 and 14 of members 1 and 2. Thus the edges 24a and 25a of plates 22 and 23 serve as stops to limit the degree of outward pivoting movement of the lens holding members 1 and 2 when the same are swung into their operative position and ensure that members 1 and 2 will not move beyond a plane perpendicular to the observer's line of vision.

If the members 1 and 2 and plates 22 and 23 were connected to bracket 15 so as to pivot freely about their respective axes, it would be difficult to maintain adjusted spacing between these parts when the instrument is held by the user since the parts would tend to pivot out of adjustment. To prevent this, bracket flanges 17 and 18 are bent slightly toward each other so that when the instrument is assembled these flanges press slightly against the top and bottom edges, respectively, of the arm portions of members 1 and 2 and plates 22 and 23. This pressing introduces a slight resistance to pivotal movement of the lens holding members and plates about their axes which is sufficient to hold them in their adjusted operative positions during use.

As heretofore mentioned, the stereoscope embodying my invention is particularly well adapted to be held by hand before the eye of an observer, that is, the instrument may easily be brought to the eyes of the observer for viewing stereograms and like illustrations in books. In addition, the instrument is adapted for use as a single or double magnifying glass and is capable of either being held in the hand or positioned to stand on a flat surface such as a table. To use the instrument as a single magnifying glass, a plate and lens holding member adjacent each other, for example plate 23 and member 2, are moved or pivoted together and grasped jointly by the right hand of the user. This permits the other lens 5 to be used as a single magnifying glass. To change the instrument into a double magnifying device, members 1 and 2 are pivoted together and lenses 5 and 6 are likewise swung together. The user may then observe the particular object through both lenses while using plates 22 and 23 as a handle. The instrument may be adjusted to stand on a table by resting the instrument on the rear edges of plates 22 and 23 so that the plates extend upwardly from the table surface to support the substantially horizontal members 1 and 2. In this position the instrument may be used to magnify small objects on the table for comparative or other purposes.

When the instrument is not in use, it may be conveniently folded together so as to occupy a minimum of space and at the same time completely protect the lenses 5 and 6 from damage. In Figure 7 the instrument is shown in a folded or inoperative position. As shown, members 1 and 2 have been pivoted together in face to face relation and plates 22 and 23 have likewise been rotated about their pivotal axes until each plate lays against the respective outside surfaces of members 1 and 2. In this position, the lenses are completely covered by plates 22 and 23 and so are protected from damage while not in use. Since the plates and lens holding members have substantially the same shape and size except that the plate arms are preferably slightly longer than the corresponding arms of the members and the plates preferably thinner than the members, the face area of the instrument in the folded position is the same as the corresponding area of any one of these parts. I have found that lens holding members having dimensions of approximately 2 inches square by $\frac{1}{16}$ inch thick and plates that are $\frac{1}{8}$ inch thick make a stereoscope that is sturdy and of convenient size for handling and one which will accommodate lenses of suitable size for the purposes intended. Thus when an instrument of this size is folded it occupies a space of approximately $2'' \times 2'' \times \frac{5}{8}''$.

Figures 8, 9 and 10 show a modified form of a stereoscope embodying my invention. In this form, the lens holding members 40 and 41 preferably are integrally connected at their respective arm portions 42 and 43 to form a unit piece or structure. Members 40 and 41 conform generally in size and shape with the members 1 and 2 described in connection with the stereoscope shown in Figures 1 to 7, and also have transverse apertures 44 and 45 therein for receiving lenses 46 and 47, respectively, through which stereoscopic pairs may be viewed.

A pair of flanges 48 and 49 secured to the top and bottom edges of the arms 42 and 43 of members 40 and 41 extend rearwardly therefrom to support the view dividing plates 50 and 51 which are pivotally connected by pins 52 and 53 to the flanges 48 and 49. Plates 50 and 51 correspond in shape, size and function to plates 22 and 23 heretofore described and are arranged to pivot about pins 52 and 53 between the operative or open position shown in Figure 8 wherein each plate lies adjacent the other and the inoperative or closed position shown in Figure 10 wherein each plate 50 and 51 lies adjacent the rear surfaces of members 40 and 41 and protectively covers the rear sides of lenses 46 and 47, respectively. It will be noted that plates 50 and 51 may be adjustably spaced apart in the open position to effect division or partitioning of the stereoscopic pairs regardless of the spacing between the pairs.

The front surfaces of lens holding members 40 and 41 are provided with projections or embossers 54 and 55, respectively, adjacent their outer ends to which shields 56 and 57 are pivotally connected for pivoting toward and away from the front surfaces of members 40 and 41. Shields 56 and 57 have substantially the same size and shape as the portion of members 40 and 41 that house the lenses. These shields have a dual function of shielding the observer's eyes from light directed from the side when the stereoscope is in the open position whereby to enhance the viewing characteristics of the instrument, and protectively covering the front surfaces of the lenses when in the closed position. The shields may be adjustably pivoted through an angle greater than 90° relative to the lens holding members to the position shown in dotted lines in Figure 9 in order to conform to the shape of the observer's head and promote comfort during use.

When the stereoscope is not in use, the plates 50 and 51 and shields 56 and 57 may be folded against opposite sides of the lens holding members to form a small, compact, completely protected unit as shown in Figure 10. Since the plates, shields and lens holding members have substantially the same profile, their outer edges will be aligned when the instrument is folded to the closed position so as to occupy a minimum of space. By way of example, a stereoscope having the same size of components as those described in connection with Figures 1 to 7 will have overall dimensions in the operative position of 4 inches long by 2 inches high by 4 inches deep, while in the inoperative position the dimension will be 4 inches long by 2 inches high by $\frac{7}{8}$ inch deep. In other details and in principle of operation this modified form of my stereoscope is substantially the same as the form previously described and features the same advantages of simplicity of design, ease of handling, comfort in use, effective partitioning of the views being observed and compactness.

The illustrated and described forms of my invention are not restrictive, and the invention may be practiced in many ways within the scope of the appended claims.

I claim:
1. A stereoscope comprising, two lens holding members, lenses mounted in said members, a bracket having a web and two spaced flanges extending from said web in parallelism, each of said members having portions disposed between and pivotally connected to said flanges at points on said flanges remote from said web, the pivotal axes of said members being spaced and substantially parallel, and two plate elements having portions extending between said flanges and pivotally connected to said flanges at points on said flanges intermediate the plane of the axes of said members and said web, the pivotal axes of said elements being parallel to and spaced apart a greater distance than the pivotal axes of said members, said portions of said plate elements when said members are pivoted away from each other about their respective axes into a common plane engaging said members and limiting further pivotal movements thereof.

2. A collapsible stereoscope for viewing spaced stereoscopic pairs of drawings comprising two substantially identical flat lens holding members, lenses detachably mounted in said members, a bracket having a web and a flange projecting laterally from each end of said web, said flanges each having an outer edge remote from said web, each of said lens holding members having an arm portion disposed between and pivotally connected to said flanges adjacent said outer edges thereof, the pivotal axes of said members being substantially parallel and being spaced apart a distance sufficient to permit said members to be pivoted into a collapsed position in juxtaposition with each other, a pair of identical plate elements each having an arm portion whose length is longer than the corresponding length of said arm portion of each lens holding member, the balance of each of said plate elements having substantially the same peripheral size and shape as the corresponding part of each of said lens holding members, the arms of said plate elements being disposed between and pivotally connected to said flanges intermediate said web and the plane of the pivotal axis of said members, the pivotal axes of said elements being parallel to and spaced further apart than the pivotal axes of said members whereby said members and said elements may be pivoted into parallel planes with the plate elements in juxtaposition to said members, respectively, and with the peripheral edges of said plate elements and said members in alignment with each other.

OLIVER M. STONE.

REFERENCES CITED

The following references are of record in the file of this patent:

UNITED STATES PATENTS

| Number | Name | Date |
| --- | --- | --- |
| 1,194,057 | Murphy | Aug. 8, 1916 |
| 2,207,705 | Cox | July 16, 1940 |
| 2,275,999 | Strauss | Mar. 10, 1942 |
| 2,396,510 | Hulst | Mar. 12, 1946 |

FOREIGN PATENTS

| Number | Country | Date |
| --- | --- | --- |
| 105,411 | Germany | Sept. 16, 1899 |
| 116,597 | Great Britain | June 20, 1918 |
| 589,289 | France | Feb. 19, 1925 |